US008502517B2

(12) United States Patent
Djenguerian et al.

(10) Patent No.: US 8,502,517 B2
(45) Date of Patent: *Aug. 6, 2013

(54) METHOD AND APPARATUS FOR CONTROLLING THE MAXIMUM OUPUT POWER OF A POWER CONVERTER

(75) Inventors: Alex B. Djenguerian, Saratoga, CA (US); Erdem Bircan, San Carlos, CA (US)

(73) Assignee: Power Integrations, Inc., San Jose, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 13/235,284

(22) Filed: Sep. 16, 2011

(65) Prior Publication Data

US 2012/0007575 A1    Jan. 12, 2012

Related U.S. Application Data

(63) Continuation of application No. 12/780,658, filed on May 14, 2010, now Pat. No. 8,030,912, which is a continuation of application No. 12/058,539, filed on Mar. 28, 2008, now Pat. No. 7,746,050.

(60) Provisional application No. 60/922,191, filed on Apr. 6, 2007.

(51) Int. Cl.
*G05F 5/00*    (2006.01)
*H02M 3/335*    (2006.01)

(52) U.S. Cl.
USPC ........... 323/299; 323/302; 363/21.12; 363/97

(58) Field of Classification Search
USPC ................. 363/21.01, 21.12–21.18, 97, 131; 323/282–285, 299–303
See application file for complete search history.

(56) References Cited

U.S. PATENT DOCUMENTS

| | | |
|---|---|---|
| 5,220,492 A | 6/1993 | Rubin et al. |
| 5,745,351 A | 4/1998 | Taurand |

(Continued)

FOREIGN PATENT DOCUMENTS

WO    WO 2005/109615 A2    11/2005

OTHER PUBLICATIONS

EP 08251342—Partial European Search Report, mailed Nov. 24, 2008.

(Continued)

*Primary Examiner* — Jessica Han
(74) *Attorney, Agent, or Firm* — Blakely Sokoloff Taylor & Zafman LLP

(57) ABSTRACT

An example controller for a power converter includes an input voltage sensor, a current sensor, an oscillator, a timing and multiplier circuit, and a drive signal generator. The input voltage sensor receives an input signal representative of an input voltage and the current sensor senses a current in a power switch. The oscillator generates a signal having a switching frequency and the timing and multiplier circuit adjusts the switching frequency of the signal to be proportional to a value that is the input voltage multiplied by a time it takes the current in the power switch to change between two current values. The drive signal generator drives the power switch into the on state for an on time period and an off state for an off time period in response to the current in the power switch and in response to the signal having the switching frequency.

10 Claims, 8 Drawing Sheets

U.S. PATENT DOCUMENTS

| | | | |
|---|---|---|---|
| 5,828,558 | A | 10/1998 | Korcharz et al. |
| 6,057,665 | A | 5/2000 | Herniter et al. |
| 6,233,161 | B1 | 5/2001 | Balakrishnan et al. |
| 6,480,399 | B2 | 11/2002 | Balakrishnan et al. |
| 6,900,995 | B2 | 5/2005 | Muegge et al. |
| 7,019,503 | B1 | 3/2006 | Ortiz et al. |
| 7,259,972 | B2 | 8/2007 | Yang |
| 7,288,924 | B2 | 10/2007 | Trandafir et al. |
| 7,352,595 | B2 | 4/2008 | Yang et al. |
| 7,463,497 | B2 | 12/2008 | Negrete |
| 7,746,050 | B2 | 6/2010 | Djenguerian et al. |
| 8,030,912 | B2 * | 10/2011 | Djenguerian et al. ........ 323/299 |
| 2007/0182397 | A1 | 8/2007 | Deguchi |
| 2008/0192514 | A1 | 8/2008 | Zhou et al. |

OTHER PUBLICATIONS

Bindra, A., "Power Supply Controller Keeps Efficiency High Across All Loads: Using digital regulation, this power controller yields high performance at low loads with unconditional stability," Analog, Power Devices & DSP, Electronic Design, Dec. 3, 2001, pp. 50-52.

iWatt, "iW2201—Digital SMPS Controller: Preliminary Data," Revision 1.1, pp. 13.

iWatt, "iW2202—Digital SMPS Controller: Preliminary Data," Revision 1.0, pp. 14.

* cited by examiner

METHOD AND APPARATUS FOR CONTROLLING THE MAXIMUM OUPUT POWER OF A POWER CONVERTER

RELATED APPLICATION

This is a continuation of U.S. application Ser. No. 12/780,658, filed May 14, 2010, now pending, which is a continuation of U.S. application Ser. No. 12/058,539, filed Mar. 28, 2008, now U.S. Pat. No. 7,746,050, which claims priority to U.S. Provisional Application No. 60/922,191, filed Apr. 6, 2007, entitled "Method And Apparatus For Controlling The Maximum Output Power Of A Power Converter." U.S. Pat. No. 7,746,050 and U.S. application Ser. Nos. 12/780,658 and 60/922,191 are hereby incorporated by reference.

BACKGROUND INFORMATION

1. Field of the Disclosure

The present invention relates generally to power converters, and more specifically, the invention relates to regulating the output of power converters.

2. Background

Many electrical devices such as cell phones, personal digital assistants (PDA's), laptops, etc. are powered by a source of relatively low-voltage DC power. Because power is generally delivered through a wall outlet as high-voltage AC power, a device, typically referred to as a power converter, is required to transform the high-voltage AC power to low-voltage DC power. The low-voltage DC power may be provided by the power converter directly to the device or it may be used to charge a rechargeable battery that, in turn, provides energy to the device, but which requires charging once stored energy is drained. Typically, the battery is charged with a battery charger that includes a power converter that meets constant current and constant voltage requirements required by the battery. Other electrical devices, such as DVD players, computer monitors, TVs and the like, also require a power converter for device operation. The power converter in these devices also has to provide output voltages and currents that meet the requirements of the device. In operation, a power converter may use a controller to regulate output power delivered to an electrical device, such as a battery, that may be generally referred to as a load. More specifically, the controller may be coupled to a sensor that provides feedback information of the output of the power converter in order to regulate power delivered to the load. The controller regulates power to the load by controlling a power switch to turn on and off in response to the feedback information from the sensor to transfer energy pulses to the output from a source of input power such as a power line.

The product of the power converter output voltage and current is termed the power converter output power. In most power converter applications, it is necessary to limit the worst case maximum output power that can be supplied to ensure the device being powered is protected from excessive power delivery. Improving the tolerance of the maximum output power that a power converter can deliver allows the electrical device being powered by the power converter to be optimized for safe operation under fault conditions, improves the electrical device reliability and reduces the overall cost of the electrical device.

One particular type of power converter that may be used is a flyback power converter. In a flyback power converter, an energy transfer element galvanically isolates the input side of the power converter from the output side. Galvanic isolation prevents DC current from flowing between the input side and the output side of the power converter.

A flyback power converter produces an output by switching a power switch to store energy in the energy transfer element during an on time of the power switch and deliver energy to a power converter output for at least a fraction of the time the power switch is off. In a non-isolated flyback converter, an energy transfer element is still required to store energy from the power converter input to be delivered to the power converter output, but no galvanic isolation is required to be provided by the energy transfer element.

In operation, a power converter may use a controller to regulate output power delivered to the load. More specifically the controller may limit a maximum output power of the power converter in response to feedback information derived by sensing output voltage and or output current at the output of the power converter. Sensing output current at the output of the power converter typically reduces power converter efficiency since a resistive element is typically introduced to provide a voltage signal proportional to the power converter output current. If the output current of the power converter is not sensed at the output of the power converter, the maximum power delivery limit is determined by the specification tolerances of certain components within the power converter.

Two components whose parameters influence the tolerance of the maximum output power of the power converter are the tolerance of the inductance of the energy transfer element and the tolerance of a protective current limit threshold for current flowing in the power switch while it is in an on state. The controller may sense the current flowing in the power switch while it is in an on state and may also set the maximum protective current limit threshold. In this case the tolerance of the controller maximum protective current limit threshold will influence the tolerance of the maximum power converter output power.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
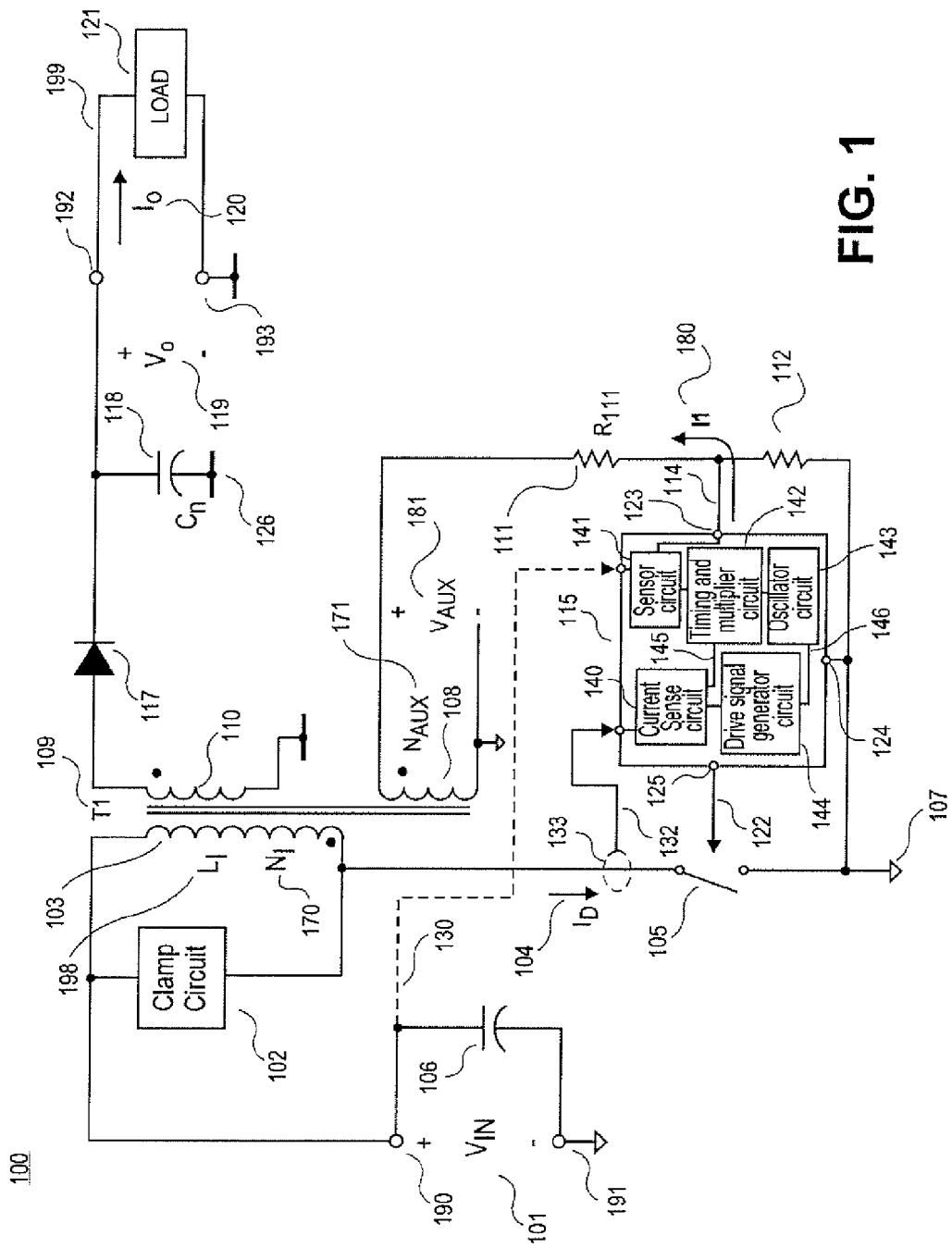
FIG. 1 shows generally one example of a switching power converter having a flyback topology and including a controller that controls the maximum output power of the switching converter in accordance with the teachings of the present invention.

Examples related to controlling a maximum output power of a power converter in accordance with the present invention are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. The particular features, structures or characteristics may be combined for example into any suitable combinations and/or sub-combinations in one or more embodiments or examples. Furthermore, the particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, examples according to the teachings of the present invention include methods and apparatuses for controlling the maximum output power of a power converter without the need to sense output voltage and/or output current at the output of the power converter. Furthermore, examples according to the teachings of the present invention compensate for energy transfer element inductance tolerance and for the tolerance of a protective current limit threshold of the current flowing in the power switch set by a controller. The elimination of the need to sense the power converter output current at the output of the power converter improves power converter efficiency and reduces the power converter component count leading to improved power converter reliability compared to known solutions. The compensation for energy transfer element inductance and controller protective current limit threshold tolerances further improves power converter reliability and allows more compact and reliable design of the power converter and load.

In one example, the maximum output power of a power converter is controlled during each switching cycle of the power switch to ensure that the power converter is responsive to changes in the energy transfer element inductance and the protective current limit threshold during the operation of the power converter. By controlling the maximum output power of the power converter in this way, the power converter is responsive to extreme operating conditions, such as very high ambient temperatures that may not have been expected during the original design of the power converter, further enhancing the reliability of the power converter and load.

To illustrate, FIG. 1 shows one example of a regulated switching power converter 100, sometimes referred to as a power supply, in accordance with the teachings of the present invention. In the particular example shown in FIG. 1, switching power converter 100 is a power converter having a flyback topology. It is appreciated, however, that there are many other known topologies and configurations of switching power supplies that could also control the maximum power converter output power in accordance with the teachings of the present invention, and that the flyback topology shown in FIG. 1 is provided for explanation purposes. It is noted that in other examples power converter 100 could have more than one output in accordance with the teachings of the present invention.

As shown, a control circuit 115 is coupled to a power switch 105, which in one example is a metal oxide semiconductor field effect transistor (MOSFET), a bipolar transistor or the like. Power switch 105 is coupled to the input winding 103 of energy transfer element 109, which is coupled to a DC input voltage $V_{IN}$ 101 and an output power diode 117. In one example, DC input voltage $V_{IN}$ 101 is the unregulated output of a rectifier circuit coupled to a source of AC voltage not shown. Input capacitor 106 is coupled to power converter input terminals 190 and 191 to provide a low impedance source for switching currents flowing through first and second input terminals 190 and 191, energy transfer element 109 winding 103 and power switch 105 when the power switch 105 is in an ON state. In one example, control circuit 115 and switch 105 could form part of an integrated circuit that could be manufactured as a hybrid or monolithic integrated circuit. Control circuit 115 is coupled to receive a signal 114, which in one example is a voltage signal, but in other examples could also be a current signal, or other signal representative of the power converter output and or input, while still benefiting from the teachings of the present invention.

In the example of FIG. 1, control circuit 115 is coupled to regulate power delivered from the first and second input terminals 190 and 191 of power converter 100 to the power converter output terminals 192 and 193 coupled to load 121. Energy transfer element 109 includes input winding 103 and output winding 110 and an auxiliary winding 108. The signal 114 is coupled to control circuit 115 from auxiliary winding 108 through the resistor divider formed by resistors 111 and 112. As shown in the example, controller 115 includes a current sense circuit 140 coupled to sense a current through power switch 105, a sensor circuit 141 coupled to receive an input signal representative of an input voltage to power converter 100, and a timing and multiplier circuit 142 that processes the output of current sense circuit 140 and sensor circuit 141. Controller 115 also includes an oscillator circuit, which is responsive to timing and multiplier circuit 142, and a drive signal generator circuit 144 coupled to drive the power switch 105 into an on state for an on time period and an off state for an off time period. In one example controller 115 is coupled to adjust a duty cycle of the power switch 105 to be proportional to a value of the input voltage signal multiplied by the time it takes for the current flowing in the power switch to change between two current values when the power switch is in the on state.

Figure 2:
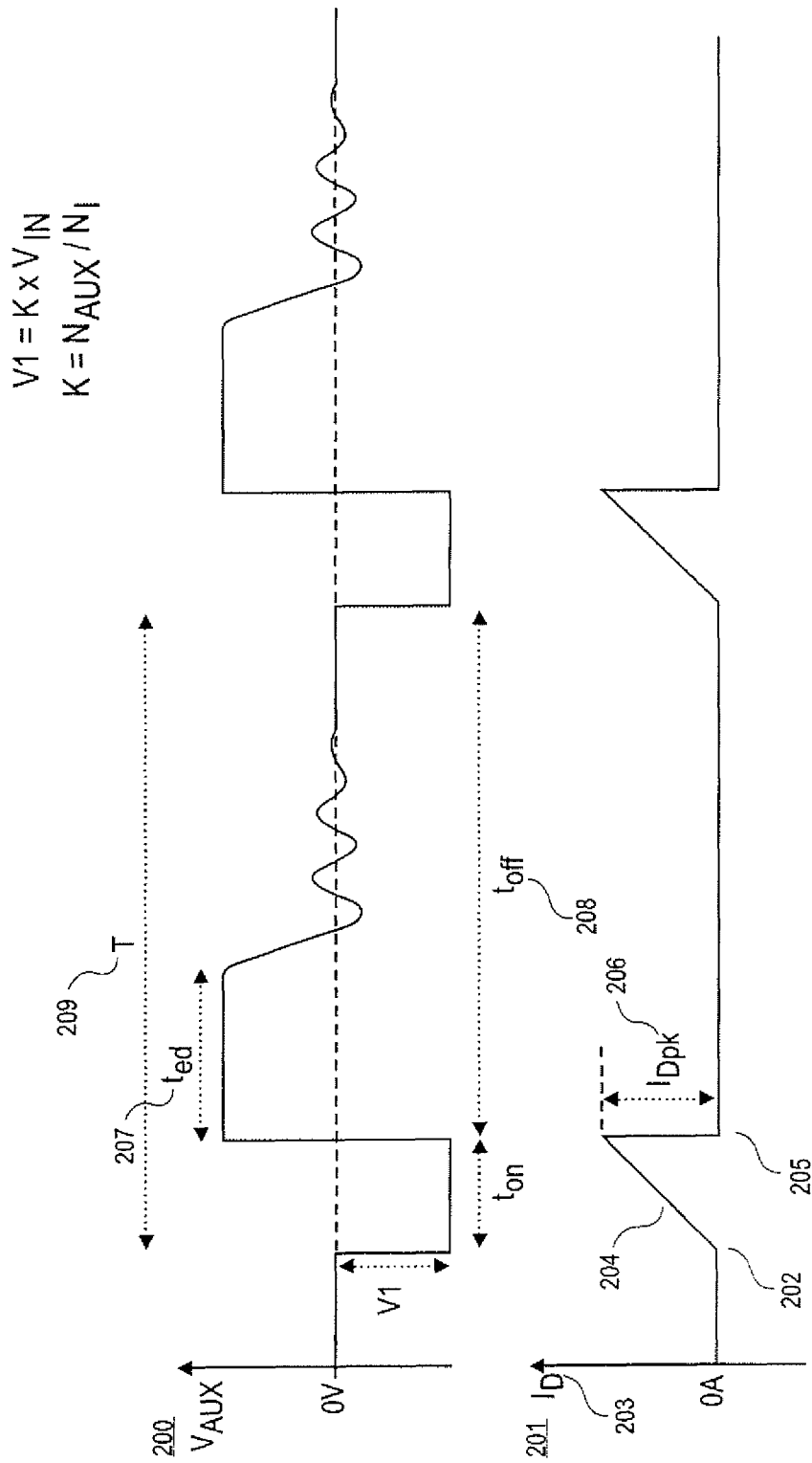
FIG. 2 shows representative switching cycles of waveforms from an example switching power converter operating in accordance with the teachings of the present invention.

The basic operation of circuit 100 will now be described with reference to waveforms 200 and 201 in FIG. 2. In operation, control circuit 115 regulates the output of power converter 100 by switching power switch 105 in response to the signal 114. When switch 105 is on, energy from the input capacitor 106 is transferred into the inductance of input winding 103 of the energy transfer element 109. One example of a typical current waveform flowing in power switch 105 is shown in waveform 201 in FIG. 2. When power switch 105 is turned on at time 202, the current $I_D$ 203 flowing through power switch 105 starts to increase. As shown in the illustrated example, the current $I_D$ 203 increases substantially linearly after power switch 105 is turned on. The rate of change of the current waveform 204 with time is given by:

$$dI_D/dt = V_{IN}/L_I \qquad (1)$$

where $V_{IN}$ is the input voltage 101 across input capacitor 106 in FIG. 1 and $L_I$ is the inductance $L_I$ 198 of input winding 103 of energy transfer element 109 measured with all other windings of the energy transfer element 109 uncoupled from external circuitry. It is noted that the relationship in equation (1) does not account for any voltage drop across power switch 105 or other second order voltage drops so as not to obscure the teachings of the present invention.

At the time 205 when the power switch 105 is turned off, the current $I_D$ 203 flowing in the power switch 105 has increased to a value $I_{Dpk}$ 206. The energy stored in inductance $L_I$ 198 of winding 103 of energy transfer element 109 is given by:

$$E_{L_I} = \tfrac{1}{2} \times L_I \times I_{DPK}^2 \qquad (2)$$

When the power switch 105 is turned off, the energy stored in the inductance $L_I$ 198 of input winding 103 is transferred to the output of the power converter 100 and a current that flows through a forward biased output power diode 117 to capacitor 118 and the load 121 coupled to the output terminals 192 and 193. While current flows through the output power diode 117 during the off period of switch 105, the output voltage $V_O$ 119 across load 121 plus the forward voltage drop across output power diode 117 is substantially equal to the voltage across the output winding 110.

In some cases, the current may substantially stop flowing from output winding 110 through the output power diode 117 during the off period of power switch 105. In this case, the operation of the power converter is referred to as discontinuous mode operation. In discontinuous mode operation, substantially all the energy stored in the inductance $L_I$ 198 of input winding 103 of the energy transfer element 109 is transferred to the output of the power supply before the power switch 105 is turned on again at the start of a next power switch switching cycle. In the example of FIG. 2, the power converter is operating in discontinuous mode since energy delivery period $t_{ed}$ 207 is less than $t_{off}$ 208. In power converters operating in discontinuous mode, the current 203 flowing in the power switch 105 starts from a value substantially equal to zero at the start of each switching cycle. If the power switch 105 switching cycle period is T 209, the power delivered ($P_{out}$) to the output of the power supply is given by:

$$P_{out} = K1 \times \tfrac{1}{2} \times L_I \times I_{DPK}^2 \times 1/T \qquad (3)$$

where K1 is a factor, less than 1, that accounts for energy lost in the energy transfer from the input to the output of the power converter 100 and can for example include losses in clamp circuit 102 that clamps energy, often referred to as leakage energy, that does not couple between the inductance $L_I$ 198 and the output of the power converter 100. The term 1/T in equation 3 is often referred to as the power switch switching cycle frequency, which in one example is determined by controller 115.

The maximum output power capability of a power converter operating in the discontinuous mode of operation can be written as:

$$P_{outmax} = K2 \times \tfrac{1}{2} \times L_I \times I_{DPKMAX}^2 \times 1/T \qquad (4)$$

where $I_{DPKMAX}$ is a maximum protective current limit current threshold determined by controller 115. K2 may be a different factor than K1 of equation (3) due to changes in the proportion of energy loss during the maximum load condition of equation (4) when compared to the load condition of equation (3). The tolerance of $L_I$, $I_{DPKMAX}$ and T from one power converter to another will determine the tolerance of $P_{outmax}$ from one converter to another. In addition, the tolerance of $L_I$, $I_{DPKMAX}$ and T in a single power converter under changing operating conditions, such as the ambient temperature in which the power converter is operating, will also determine the tolerance of $P_{outmax}$.

Now rearranging equation (1):

$$dI_D \times L_I = V_{IN} \times dt \qquad (5)$$

Substituting values for the condition of a maximum power converter load gives:

$$dI_{DPKMAX} \times L_I = V_{IN} \times dt_{onmax} \qquad (6)$$

Therefore, any variation in either $I_{DPKMAX}$ or $L_I$ will result in a change in the $V_{IN} \times dt_{onmax}$ product according to the relationship of equation (6). As will be described below, the controller 115 for example can be coupled to detect and measure both $V_{IN}$ and $dt_{onmax}$ in order to generate an internal signal responsive to the $V_{IN} \times dt_{onmax}$ product and adjust a switching cycle period of the power switch 105 to be proportional to the $V_{IN} \times dt_{onmax}$ product. In this way, the power switch switching cycle period is responsive to any change in either $I_{DPKMAX}$ or $L_I$ to reduce the variation in the maximum output power of the power converter as a result of variation in $I_{DPKMAX}$, $L_I$ or a combination of both.

There are many ways that controller 115 may be coupled to receive a signal representative of the input voltage $V_{IN}$ 101. In one example, a direct connection 130 is made between the input capacitor 106 and controller 115. In another example, controller 115 is coupled to detect current I1 180 flowing out of terminal 123 during the period when the power switch 105 is in the on state. During this period, the voltage at terminal 123 is clamped to be substantially the same as the voltage at terminal 107. This current I1 180 is therefore representative of the input voltage $V_{IN}$ 101 since the voltage appearing across auxiliary winding 108 during the power switch 105 on time period is substantially equal to the input voltage $V_{IN}$ 101 multiplied by the turns ratio of $N_{AUX}$ 171 to $N_I$ 170. The choice of resistor 111 therefore determines the value of the current I1 180 flowing during the power switch 105 on time. Thus, current I1 180 is a signal representative of the input voltage $V_{IN}$ 101. In one example current I1 180 can be written as $$I1 = K\,V_{IN} \qquad (7)$$

where:

$$K = \{N_{AUX}/N_I\}/R_{111} \qquad (8)$$

The relationship in equation (8) above assumes that terminal 123 is substantially at the potential of ground terminal 124 when the power switch 105 is in the on state.

Figure 3:
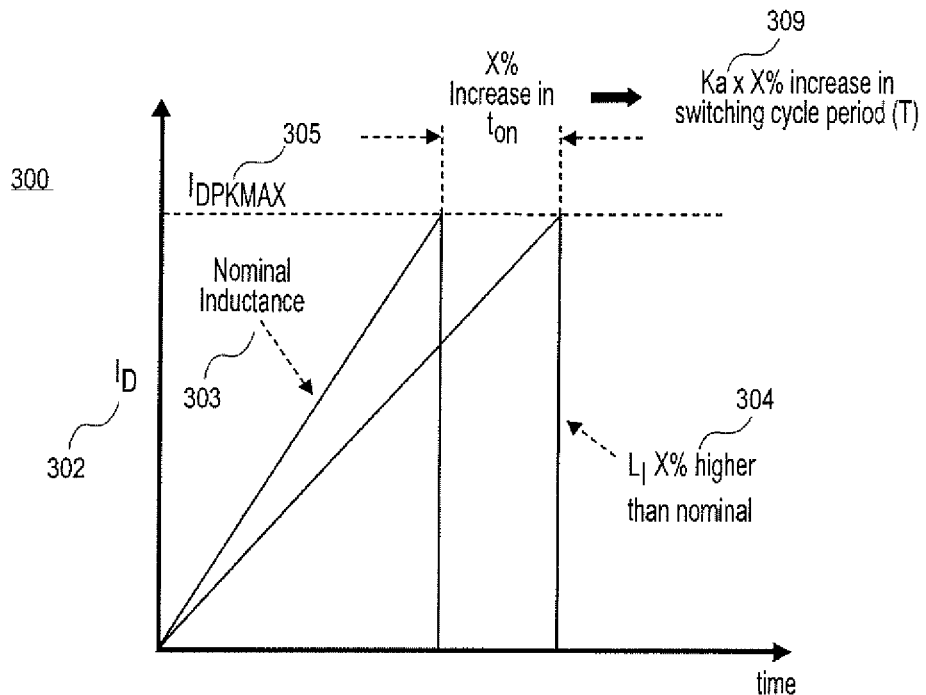
FIG. 3 shows example waveforms of inductance and current limit correction in accordance with the teachings of the present invention.
Figure 3:
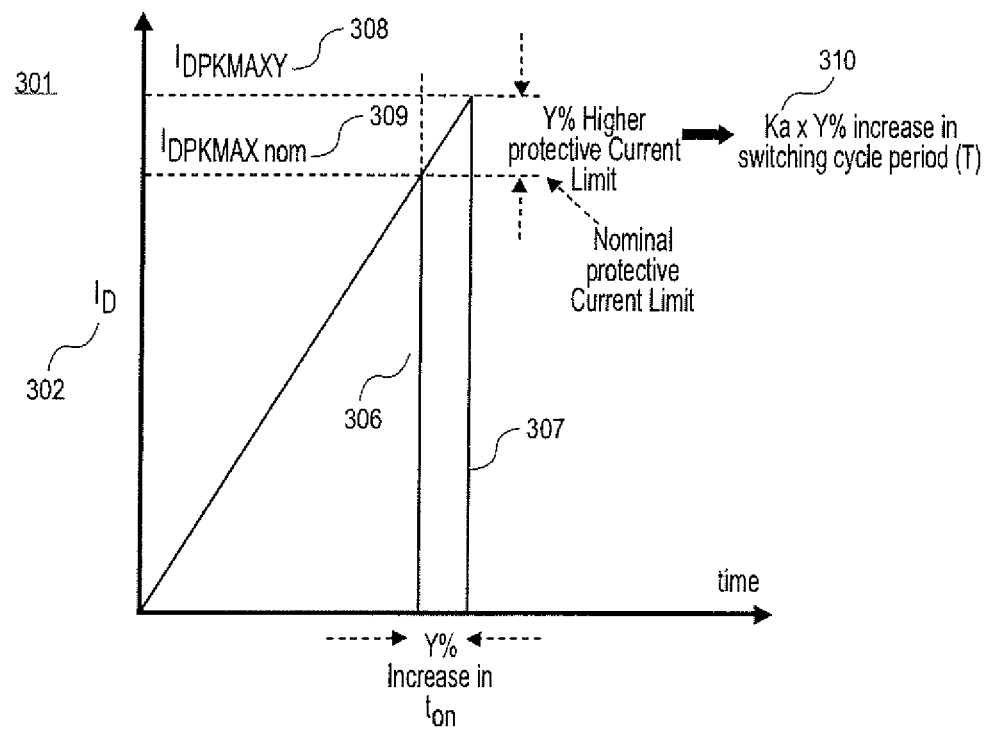

The waveforms of FIG. 3 are used below to describe examples of how the relationship of equation (6) may be used to control the maximum power output of the power converter. In the example, the waveforms 300 example of FIG. 3 show two power switch 105 current waveforms 303 and 304. In both waveforms 303 and 304, the power switch current $I_D$ 302 ramps to a final value substantially equal to $I_{DPKMAX}$ 305, which is a protective current limit threshold defining the maximum peak current that can flow in the power switch 105 that is set by for example controller 115 in FIG. 1. As shown, the X % higher energy transfer element input winding inductance $L_I$ in the case of waveform 304, requires that the power switch 105 be on for X % longer than the power switch 105 is on in waveform 303 to reach the same protective current limit threshold $I_{DPKMAX}$ 305. The increase in the power switch 105 on time is therefore directly proportional to the increase in energy transfer element input winding inductance as predicted in the relationship of equation (1) assuming $V_{IN}$ is constant. If in response to this increase in power switch 105 on time, the power switch switching cycle period T in equation (4) is also increased by X %, the value of $P_{outmax}$ will remain substantially constant since $L_I$ is also X % higher. Therefore, in the case of energy transfer element input winding inductance $L_I$ tolerance, the correct value for factor Ka 309 is substantially equal to 1.

The waveforms 301 example of FIG. 3 show two power switch 105 current waveforms 306 and 307. As shown, current waveforms 306 and 307 increase substantially linearly while power switch 105 is on until the current waveforms 306 and 307 reach the protective current limit thresholds. In the example, waveform 306 has a protective current limit threshold of $I_{DPKMAXnom}$ 309 while waveform 307 has a protective current limit threshold of $I_{DPKMAXY}$ 308, which is Y % higher than current limit threshold $I_{DPKMAXnom}$ 309. Therefore, the power switch 105 on time will increase by substantially Y % when the protective current limit threshold increases by Y %.

From the relationship of equation (4) however, the influence of this Y % increase of current limit threshold has a square law effect on the maximum output power capability $P_{outmax}$ outmax of the power converter 100. For example if the $I_{DPKMAX}$ value in equation (4) is increased by 5%, the $P_{outmax}$ value in equation (4) increases by substantially 10%. The fact that squaring a small percentage change, such as for example ±15%, results in a substantial doubling of the overall percentage change, allows factor Ka 310 in FIG. 3 to be chosen to be substantially equal to 2 in order to substantially cancel the effects of changes in the power switch protective current limit threshold.

Figure 4:
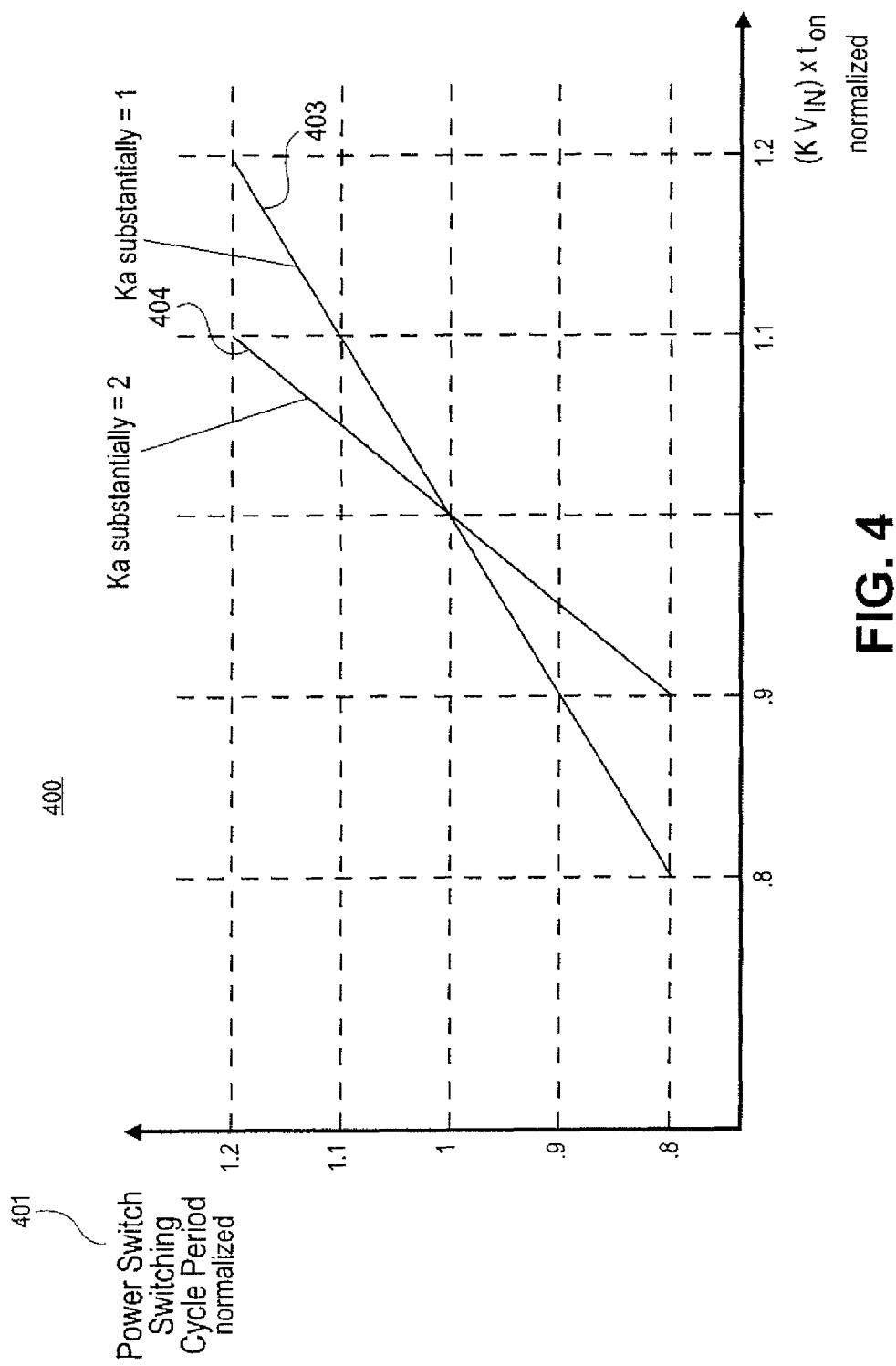
FIG. 4 shows two examples of curves displaying a relationship between power switch switching cycle period and a product of a signal representative of an input voltage to the power converter and the on time period of the power switch in accordance with the teachings of the present invention.

FIG. 4 shows curves for the relationship between power switch switching cycle period and the product of a signal representative of an input voltage to the power converter and an on time period of the power switch $t_{on}$. As discussed above, a value of Ka substantially equal to 1 will substantially cancel variations in the energy transfer element input winding inductance $L_I$ while a value of Ka substantially equal to 2 will substantially cancel variations in the protective current limit threshold of controller 115.

Figure 5:
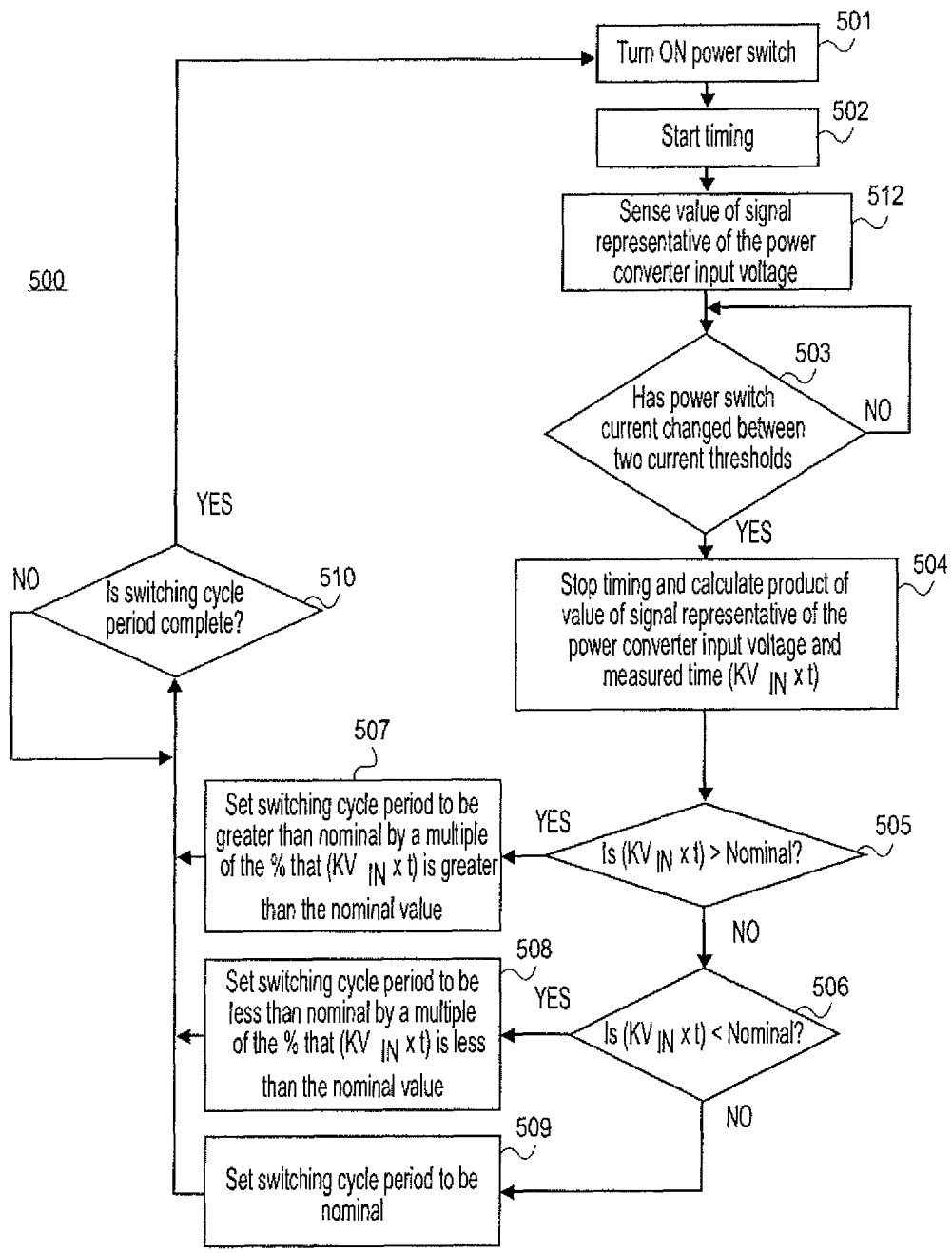
FIG. 5 shows a flow diagram that describes an example method to regulate an output of a switching power converter in accordance with the teachings of the present invention.

FIG. 5 shows a flowchart of an example method for controlling the maximum output power of a power converter in accordance with the teachings of the present invention. In block 501 the power switch is turned on and in block 502 a timing period is started. It is noted with reference to the above descriptions that although the timing period discussed thus far is the on time period of the power switch, the timing period could start and end at any time during the on time of the power switch when there are two separate current levels in the power switch. In block 512, the signal representative of an input voltage to the power converter is sensed. In block 503, it is determined if the power switch current has changed between two current thresholds since the timing period began. In the description so far, the first current threshold has been substantially zero and the second current threshold has been at the protective current limit threshold. However it is noted that if only correction for the tolerance of the energy transfer element input winding inductance is required, two other current threshold values could be employed to determine the slope of the power switch current waveform during the power switch on time. It is noted that if correction for tolerance in the protective current limit threshold is required, at least one of the current thresholds in block 503 has to be the protective current limit threshold. In block 504, the timing is stopped and the product ($KV_{IN}\times t$) of the signal representative of the input voltage and the measured time between starting and stopping the timer is calculated. Blocks 505, 506, 507, 508 and 509 determine the action required based on the calculation of ($KV_{IN}\times t$). In particular, if ($KV_{IN}\times t$) is greater than a nominal value in block 505, the power switch switching cycle time is increased in block 507. In one example, the nominal value may be determined at the design stage of the power supply. In particular, a designer can calculate what the nominal values will be to achieve the desired output power. To illustrate, by selecting a resistor $R_{111}$, and therefore K, the designer can choose the nominal operating period for a given ($V_{IN}\times t$) from FIG. 4. For example the nominal period could be the point (1.1) in FIG. 4. If ($KV_{IN}\times t$) is greater than nominal (e.g. more than 1 in FIG. 4) the period would increase. Referring back to FIG. 5, if ($KV_{IN}\times t$) is less than nominal in block 506, the power switch switching cycle time is decreased in block 508. If ($KV_{IN}\times t$) is at the nominal value, no change to the switching cycle period is made in block 509. Block 510 determines whether the present switching cycle period is complete before starting the next power switch switching cycle at block 501.

It is noted that although the above description employs the power switch switching period as the control parameter for adjustment based on the measured value of the ($KV_{IN}\times t$) product, more generally the ratio of the power switch on time to the power switch off time during any power switch switching cycle period, known as the power switch duty cycle, is a broader description of the same control functionality. In general, the power switch duty cycle can be adjusted by adjusting the power switch switching cycle period but also by other techniques including adjusting the power switch protective current limit threshold, directly controlling the period of time for which the power switch is on during each switching cycle period, on/off control, pulse width modulation or other suitable power converter switching techniques.

Figure 6:
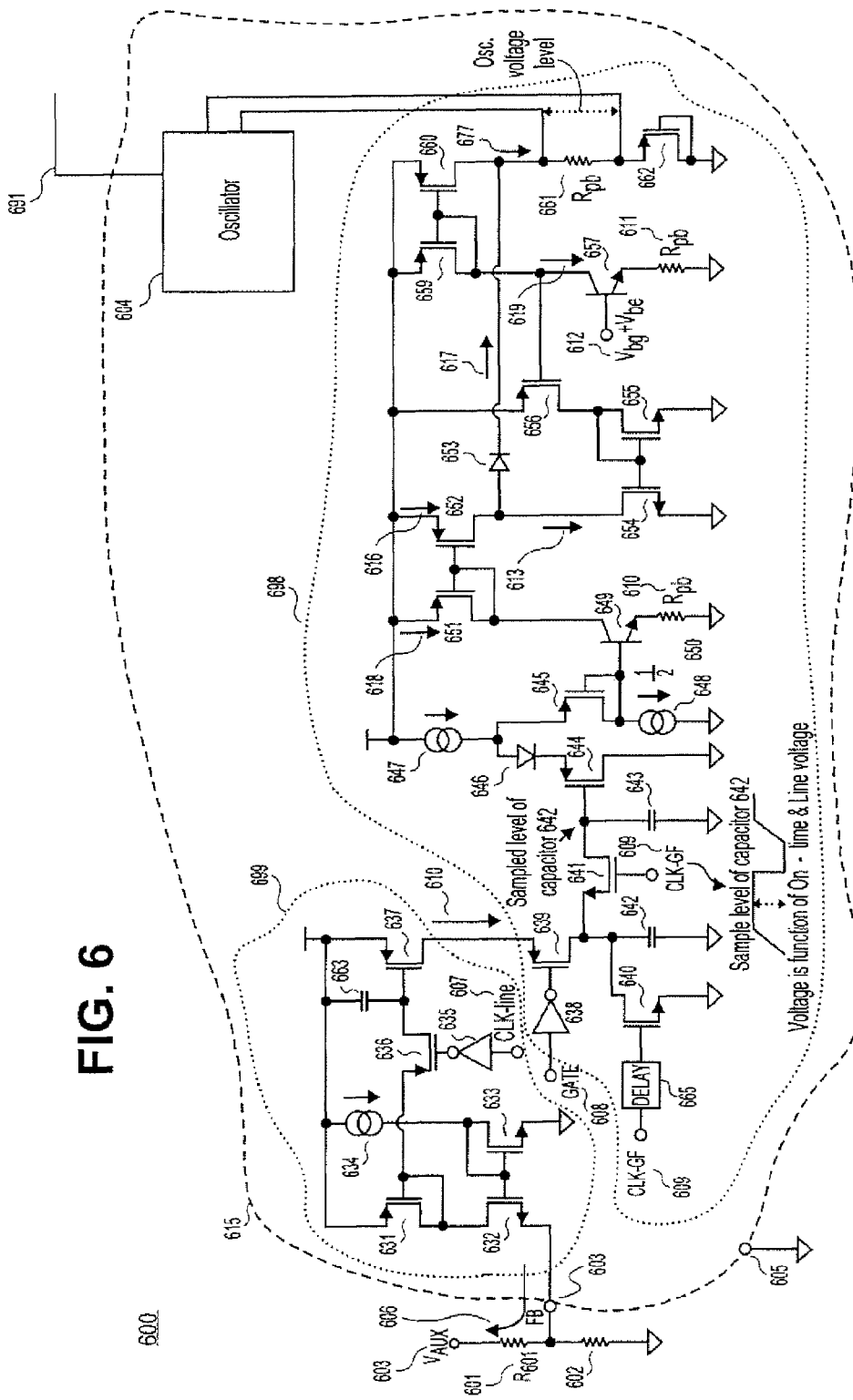
FIG. 6 shows internal details of an example integrated circuit that implements a control technique in accordance with the teachings of the present invention.
Figure 7:
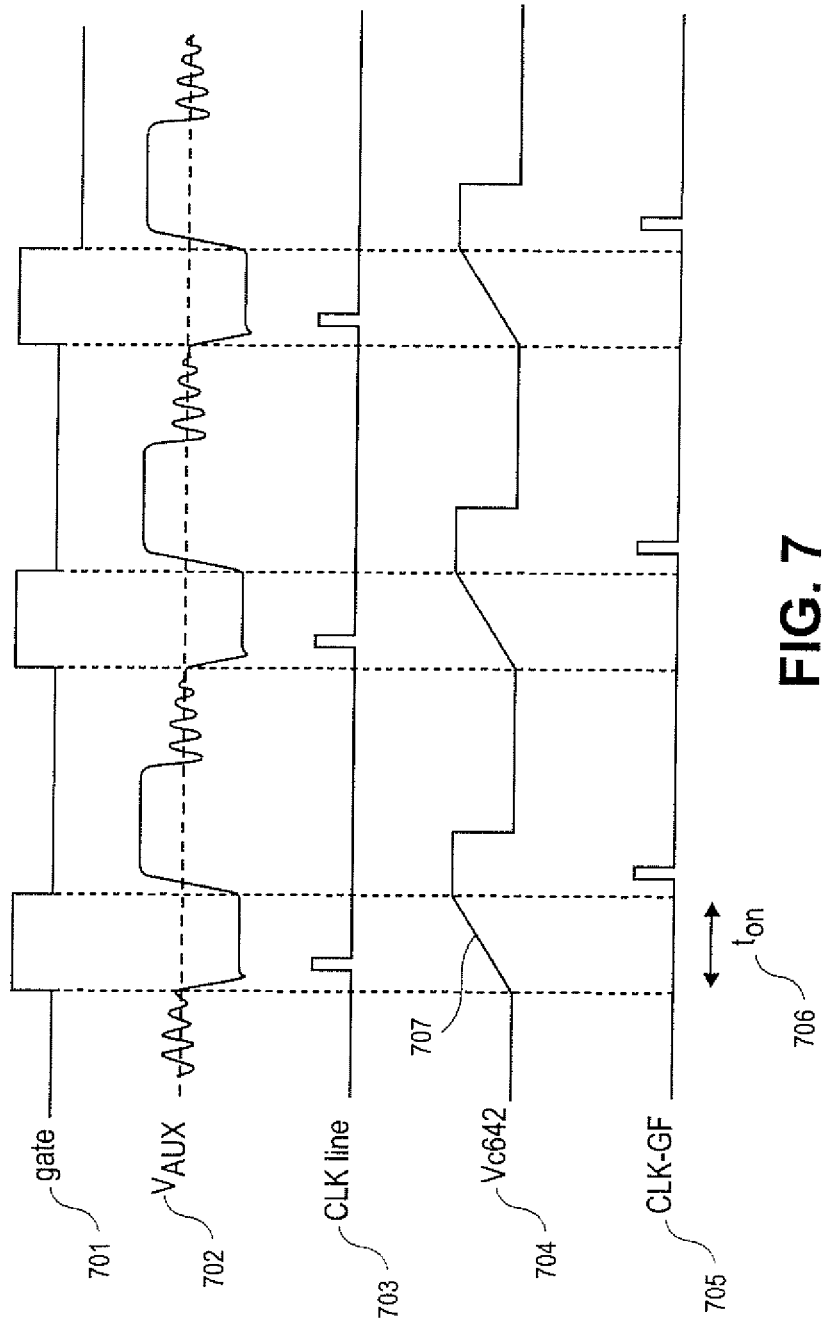
FIG. 7 shows timing waveforms of the example integrated circuit of FIG. 6 in accordance with the teachings of the present invention.

FIG. 6 shows a detailed schematic of a portion of a controller 615 that in one example is equivalent to controller 115 in FIG. 1. Voltage source $V_{AUX}$ 603 is in one example equivalent to auxiliary winding voltage $V_{AUX}$ 181 in FIG. 1. In one example the controller 615 is coupled to drive a power switch equivalent to power switch 105 in FIG. 1. In one example resistor 601 is equivalent to resistor $R_{111}$ in FIG. 1. In one example ground potential terminal 605 is equivalent to ground potential terminal 124 in FIG. 1. The following description of the circuit 600 of FIG. 6 references waveforms 700 in FIG. 7.

As shown in FIG. 6, current signal 606 representative of an input voltage $V_{IN}$ 101 to the power converter flows during the on time of the power switch 105. The coupling of the gates of transistors 632 and 633 maintains the voltage at FB terminal 603 substantially equal to controller ground potential 605 such that the value of the current signal 606 is substantially equal to $V_{AUX}/R_{601}$. Current source 634 biases transistor 633. Current 606 also flows in transistor 631, which forms a current mirror with transistor 637. However, due to the presence of transistor 636, which is only on for a period that CLK-line 607 is high, the voltage on the gate of transistor 631 is sampled and held on capacitor 663 until the next time CLK-line signal 607 goes high. It will be noted that CLK-line signal waveform 703 goes high a delay period after the start of power switch on time 706. In one example, this delay period is substantially equal to 400 nsecs and the duration of CLK-line pulse high is substantially equal to 100 nsecs. The held voltage across capacitor 663 sets the value of current that flows in transistor 637 when transistor 639 is on. Transistor 639 is turned on for the duration that the power switch gate drive signal 608 and 701 is high, which in one example is equivalent to signal 122 in FIG. 1. During the on time of transistor 639, capacitor 642 is therefore charged with a fixed current as illustrated by waveform 704 in FIG. 7. Since the value of the charge current 610 is determined by the value of current signal 606 as described above, the slope of rising voltage 707 is responsive to the value of the current signal 606, which is representative of the input voltage to the power converter. Capacitor 642 is charged at this rate for the on time period of the power switch such that the voltage across capacitor 642 at the end of the power switch on time period is representative of the product of an input voltage signal and the on time period of the power switch. It is noted that by replacing gate signal 608 with a signal that is high only for a portion of the power switch on time period, a time period other than the complete on time period of the power switch could be selected. A further gating signal CLK-GF 609 turns on transistor 641 for a short period that may in one example be substantially 100 nsecs allowing capacitor 643 to sample and hold the voltage across capacitor 642. A delayed version of CLK-GF signal 609 is applied to transistor 640 to reset capacitor 642 to be ready for the next power switch on time during the next switching cycle. Components 644, 645, 646, 647, 648 and 649 provide a high impedance buffer circuit to ensure that capacitor 643 is coupled only to high impedance to help prevent discharge of capacitor 643. This high impedance buffer operates to provide a voltage across resistor 610 that is substantially equal to the voltage across capacitor 643. Since a known voltage is therefore established across a known resistor 610, a known current 618 flows in transistor 651 and is mirrored as current 616 flowing in transistor 652. A reference voltage level $V_{bg}+V_{be}$ 612 applied to the base of transistor 657 applies a voltage $V_{bg}$ across resistor 611, which in one example has substantially equal value to resistor 610, setting up a current 619 that is reflected once by transistor 656 and again by transistors 655 and 654 to provide current 613. It will be noted that diode 653 is reverse biased and current 617 therefore substantially equal to zero, until current 616 described above exceeds the value of current 613. For current 616 values in excess of current 613, current 617 contributes to current 677 flowing in resistor 661, which in turn adjusts the oscillator voltage level and therefore oscillator frequency that is the reciprocal of the power switch switching cycle period. In one example oscillator 604 includes a capacitor that is charged and discharged between the two node voltages of resistor 661.

It is noted that the action of current 613 and diode 653 ensure that current 616 has no influence on the power switch switching cycle period below a threshold value. This limits the tolerance of energy transfer element input winding inductance and controller protective current limit threshold that can be compensated for.

From the circuit description above, it is clear that since the degree of influence current 677 has on the oscillator switching frequency is a function of the value of resistor 661 that the value of Ka in FIG. 4 is substantially fixed. It is therefore necessary to choose whether the controller is to correct substantially completely for energy transfer element inductance and therefore only partially for tolerance in the protective current limit threshold. Alternatively the choice of resistor 661 could be made to correct substantially completely for the protective current limit threshold and therefore over compensate for energy transfer element inductance tolerance. In a practical circuit, a choice may be made to provide a compromise somewhere between the values of Ka=1 and Ka=2 illustrated in FIG. 4. One example practical choice for the value of Ka would be substantially equal to 1.3.

With reference to the circuit of FIG. 1, the circuit of FIG. 6 includes a sensor circuit 699, which in one example is equivalent to sensor circuit 141, a timing and multiplier circuit 698, which in one example is equivalent to timing and multiplier circuit 142 and an oscillator 604, which in one example is equivalent to oscillator circuit 143. The circuit of FIG. 6 also shows a signal 691 that in one example is equivalent to signal 146 in FIG. 1, which is coupled to the drive signal generator circuit 144, and a signal 608, which in one example is equivalent to the output signal 145 from current sense circuit 140 in FIG. 1.

In the specific example of FIG. 6, since the controller gate drive signal 608 is generated when a protective current limit threshold has been reached, the gate drive to the power switch 105 is equivalent to the output signal 145 in FIG. 1. It is noted, however, that if current threshold values other than the protective current limit threshold were used to control timing and multiplier circuit 142 with signal 145, that signal 145 would not correspond to the power switch gate drive signal 608.

The above description therefore illustrates the detailed realization of a circuit implementation that may form a portion of a controller coupled to a power switch and coupled to receive an input voltage signal representative of an input voltage to the power supply. A time period being the time for which the power switch is in an on state which in one example is a time taken for a current flowing in the power switch to change between two current values, the controller to adjust a switching cycle period of the power switch to be proportional to the product of the input voltage signal and the time period.

In the above description of control circuit 615, an oscillator 604 period is responsive to a voltage across a resistor 661. It is noted however that in another example the oscillator period could alternatively be responsive to a value of a digital counter circuit while still benefiting from the teachings of the present invention. In one example, a digital counter circuit could be incremented at a frequency higher than the power switch switching frequency, responsive to the value of the input signal representative of the input voltage to the power converter. The value of the digital counter count could then be compared to a threshold number to set the oscillator 604 frequency in the following switching cycle. It is noted that other techniques could be used as alternatives to the above descriptions for controlling the oscillator period while still benefiting from the broader teachings of the present invention.

It is noted that the circuit realization described in FIG. 6 provides a cycle by cycle adjustment of the oscillator period. It is noted that alternatives to the above descriptions where the oscillator period is adjusted over multiple cycles could be used while still benefiting from the broader teachings of the present invention.

Figure 8:
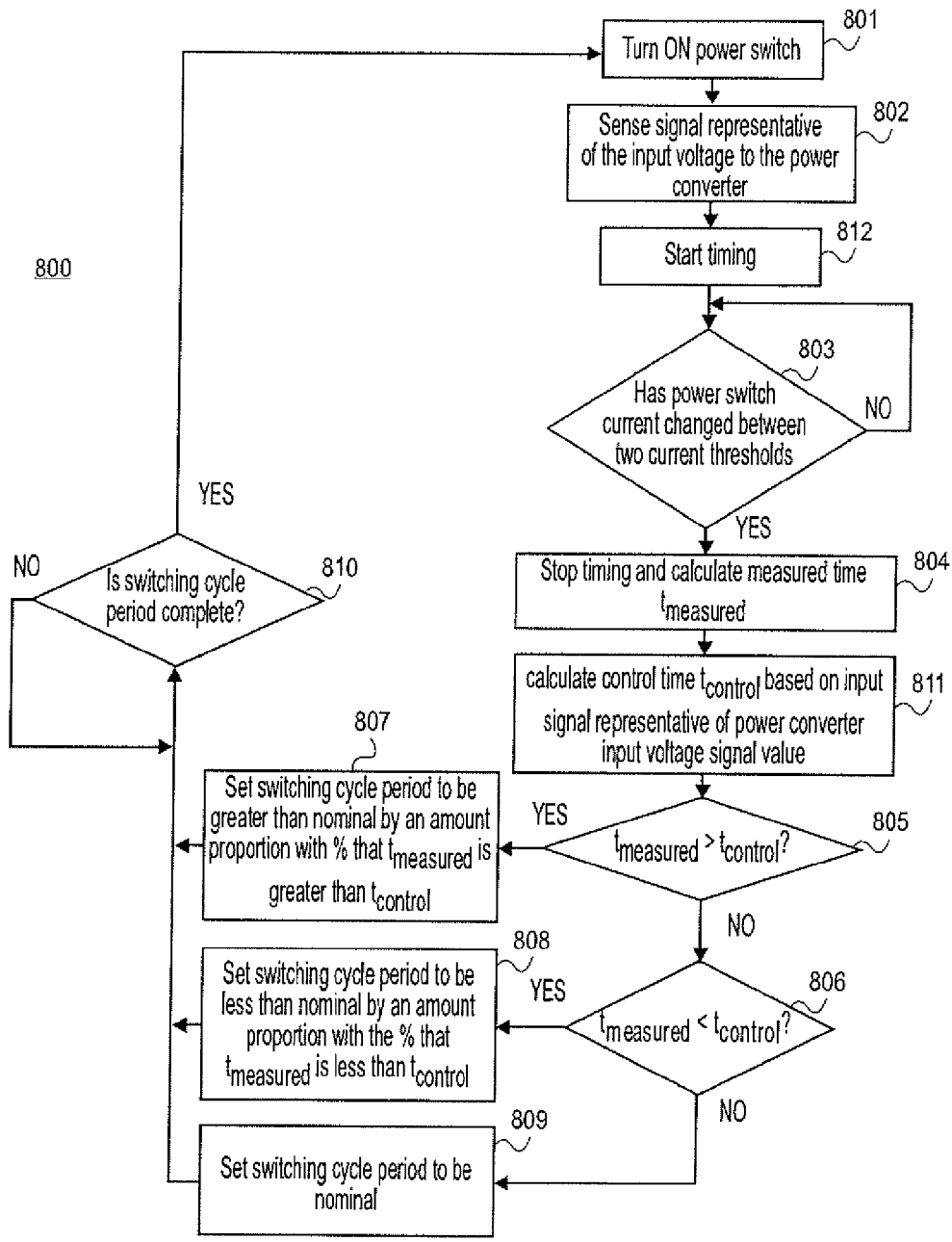
FIG. 8 shows a flow diagram that describes an alternate example of a method to regulate an output of a switching power converter in accordance with the teachings of the present invention.

The preceding description describes techniques whereby the power switch switching cycle period is adjusted in response to a product of a signal representative of an input voltage and a time period taken for a current flowing in the power switch to change between two threshold values. It is noted however that an equivalent method to achieve the similar functionality would be to measure the time taken for a current flowing in the power switch to change between two threshold values and compare this time with an expected or control time period that is responsive to an input voltage signal representative of an input voltage to the power supply. Then to adjust a power switch duty cycle in response to the difference between the measured and control time periods. In one example the method used to adjust power switch duty cycle is to adjust the power switch switching cycle period. The flowchart of FIG. 8 illustrates such a method. The power switch is turned on in block 801 and the signal representative of the input voltage to the power supply is sensed in block 802. A timer is started in 812 and a determination of whether the current in the power switch has changed between two threshold values is made in block 803. In block 804, the timing is stopped and $t_{measured}$ is calculated. In block 811, the expected or control time period, $t_{control}$, is calculated. In blocks 805, 806, 807, 808 and 809 the power switch switching cycle period is adjusted in response to the comparison between $t_{control}$ and $t_{measured}$. In particular, if $t_{measured} > t_{control}$ in block 805, the power switch switching cycle period is increased in block 807. If $t_{measured} < t_{control}$ in block 806, the power switch switching cycle period is decreased in block 808. If $t_{measured}$ is substantially equal to $t_{control}$ the power switch switching cycle period is left unchanged in block 809.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for a power converter, comprising:
    an input voltage sensor to be coupled to receive an input signal representative of an input voltage of the power converter;
    a current sensor to be coupled to sense a current in a power switch;
    an oscillator coupled to generate a signal having a switching frequency;
    a timing and multiplier circuit coupled to the oscillator to adjust the switching frequency of the signal to be proportional to a value that is the input voltage multiplied by a time it takes the current in the power switch to change between two current values when then the power switch is in an on state; and
    a drive signal generator to be coupled to drive the power switch into the on state for an on time period and an off state for an off time period in response to the current in the power switch and in response to the signal having the switching frequency.

2. The controller of claim 1, wherein one of the two current values is substantially zero.

3. The controller of claim 1, wherein one of the two current values is a protective current limit value.

4. The controller of claim 1, wherein the input signal is a voltage signal.

5. The controller of claim 1, wherein the input signal is a current signal.

6. The controller of claim 1, wherein the switching frequency of the oscillator is responsive to changes in an inductance of an energy transfer element of the power converter.

7. The controller of claim 1, wherein the timing and multiplier circuit is adapted to generate a oscillator voltage that is responsive to the value that is the input signal multiplied by the time it takes the current in the power switch to change between two current values when then the power switch is in the on state, and wherein the oscillator is coupled to receive the oscillator voltage and adjust the switching frequency in response thereto.

8. The controller of claim 7, wherein the oscillator includes a capacitor that is charged and discharged between two voltages responsive to the oscillator voltage to generate the signal having the switching frequency.

9. The controller of claim 1, wherein the timing and multiplier circuit includes a capacitor that is charged with a charge current for the time that it takes the current in the power switch to change between the two current values, wherein the charge current is representative of the input voltage.

10. The controller of claim 1, wherein the current sensor generates a gate signal representative of the time it takes the current in the power switch to change between two current values when then the power switch is in the on state, wherein the input voltage sensor generates a charge current representative of the input voltage, and wherein the timing and multiplier circuit adjusts the switching frequency of the signal in response to the gate signal and in response to the charge current.

* * * * *

UNITED STATES PATENT AND TRADEMARK OFFICE
CERTIFICATE OF CORRECTION

| | | |
|---|---|---|
| PATENT NO. | : 8,502,517 B2 | Page 1 of 1 |
| APPLICATION NO. | : 13/235284 | |
| DATED | : August 6, 2013 | |
| INVENTOR(S) | : Alex B. Djenguerian et al. | |

It is certified that error appears in the above-identified patent and that said Letters Patent is hereby corrected as shown below:

On the Title Page, Item 54 and in the Specification, Column 1, the Title, "METHOD AND APPARATUS FOR CONTROLLING THE MAXIMUM OUPUT POWER OF A POWER CONVERTER" should read --METHOD AND APPARATUS FOR CONTROLLING THE MAXIMUM OUTPUT POWER OF A POWER CONVERTER--.

Signed and Sealed this
Fourteenth Day of October, 2014

Michelle K. Lee
*Deputy Director of the United States Patent and Trademark Office*